Nov. 28, 1950
K. W. DEAN ET AL
2,531,874
SORTING APPARATUS
Filed Dec. 17, 1945
7 Sheets-Sheet 1
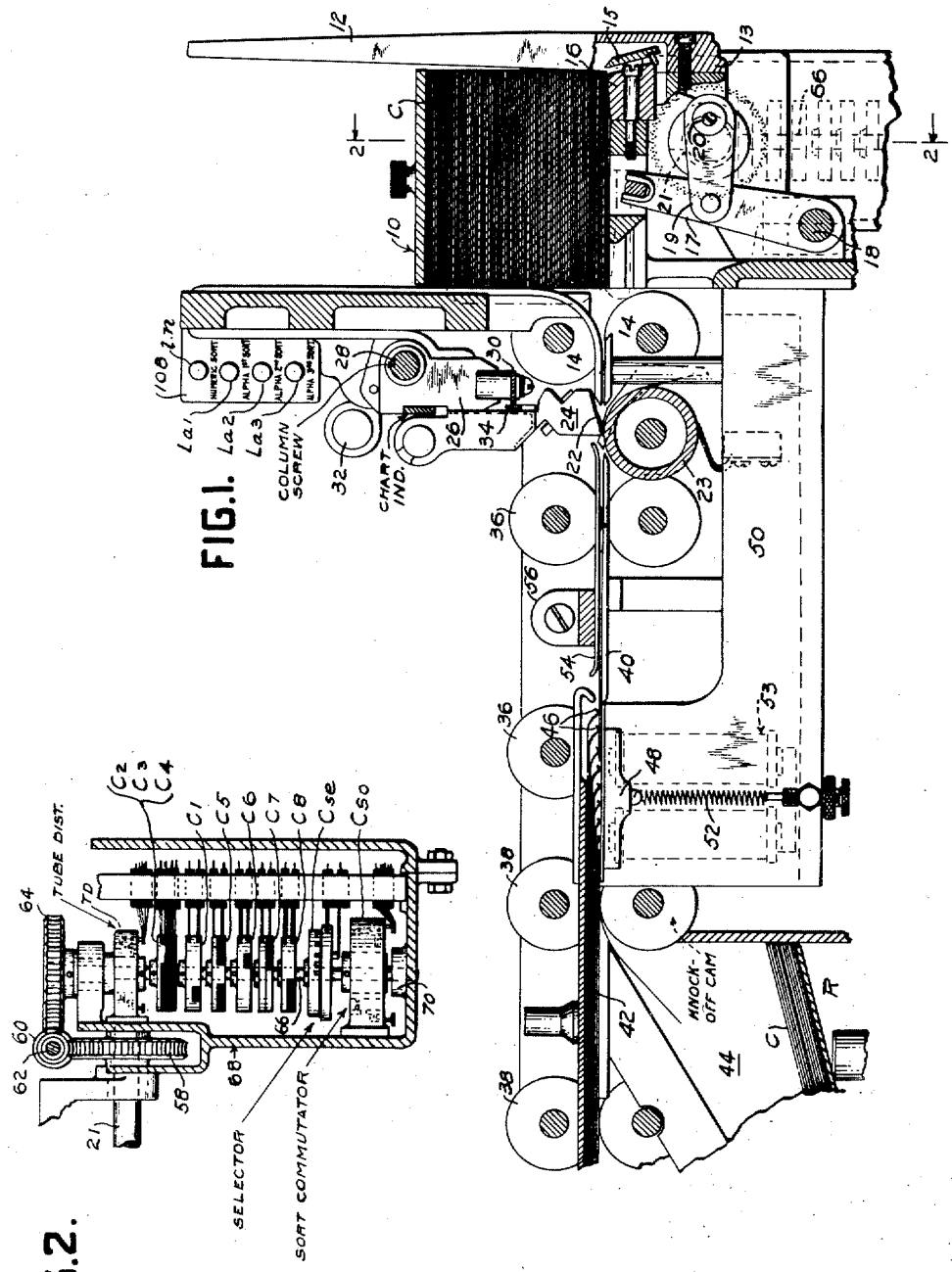
INVENTORS
K. W. DEAN
H. S. BEATTIE
R. E. PAGE
BY
ATTORNEY.

Nov. 28, 1950 K. W. DEAN ET AL 2,531,874
SORTING APPARATUS
Filed Dec. 17, 1945 7 Sheets-Sheet 2
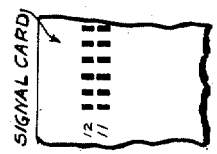
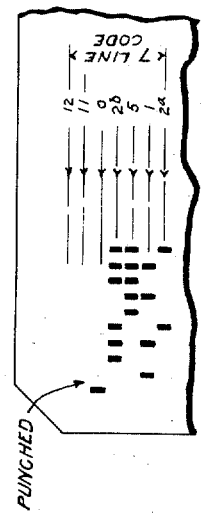
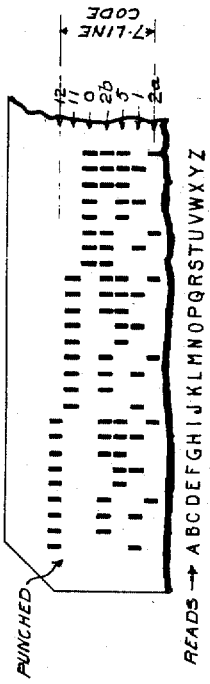
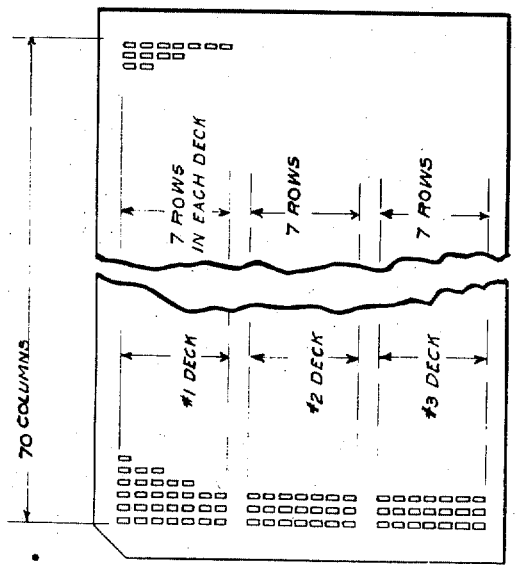
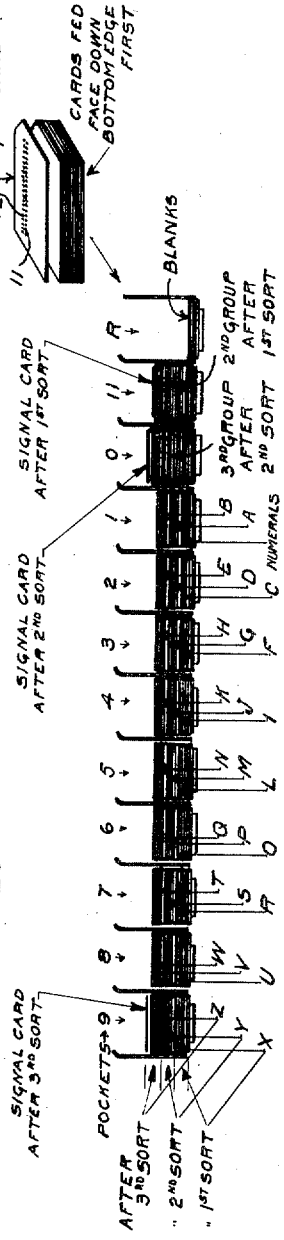
INVENTORS
K. W. DEAN
H. S. BEATTIE
R. E. PAGE
BY
W. M. Wilson
ATTY.

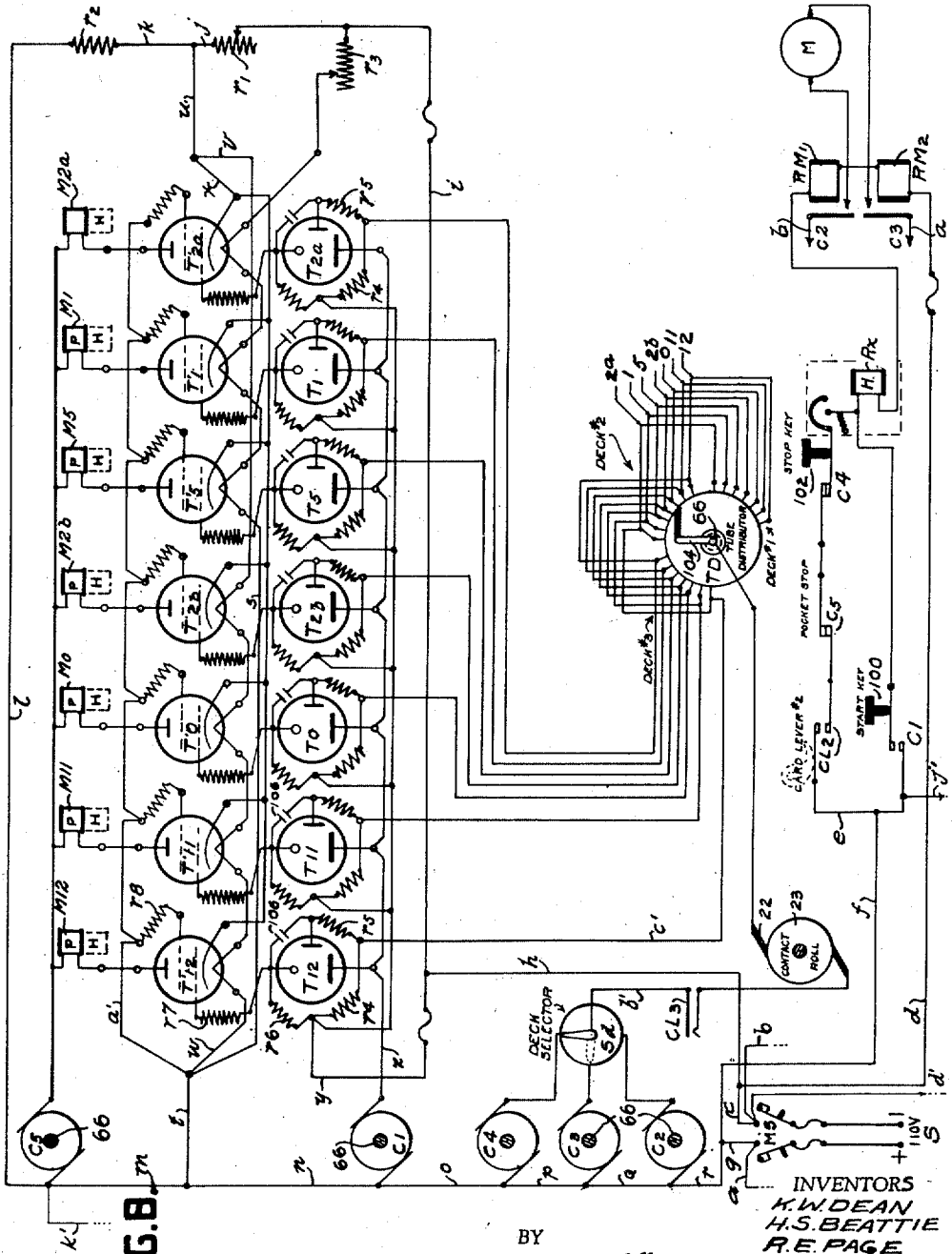

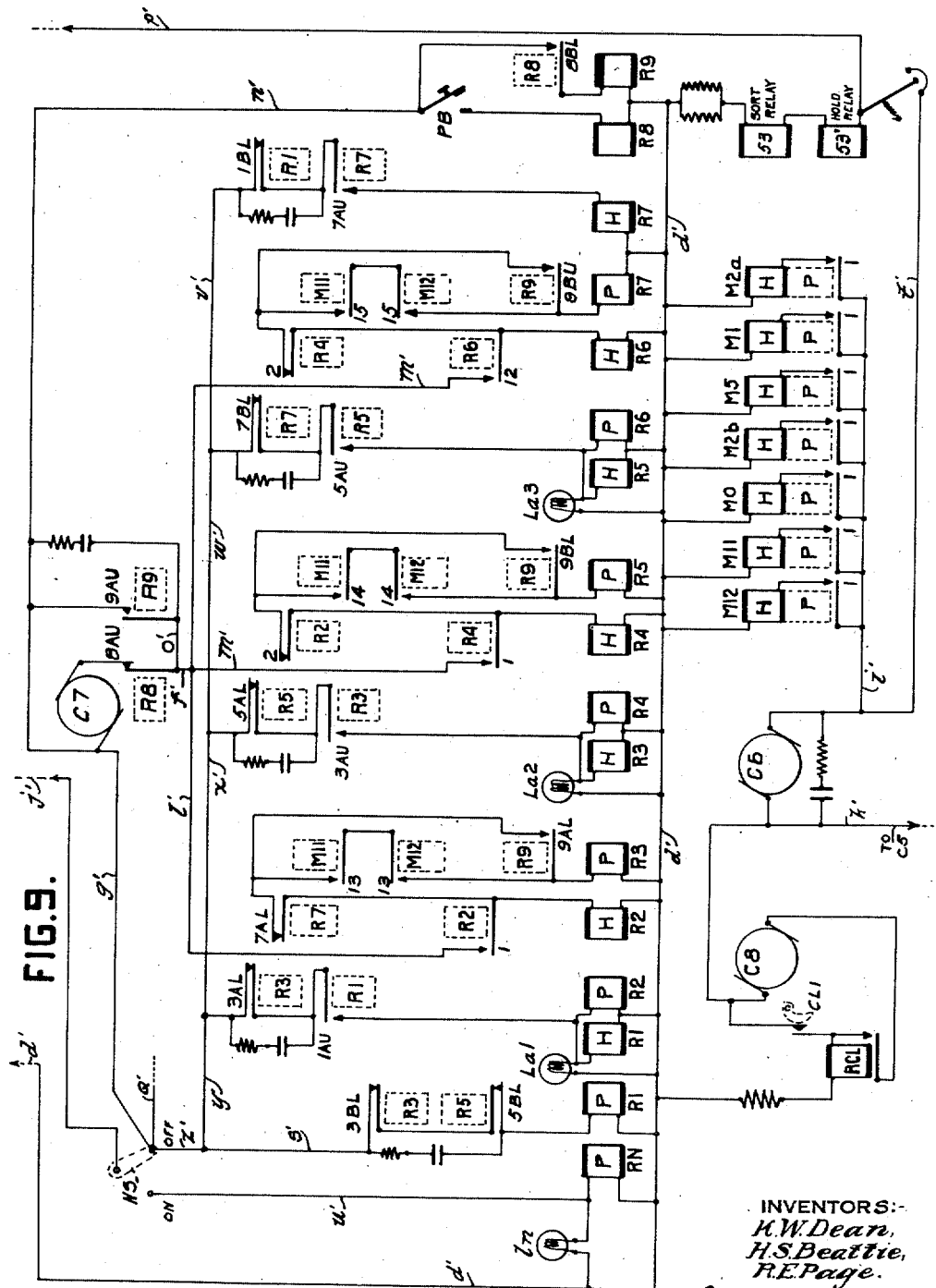

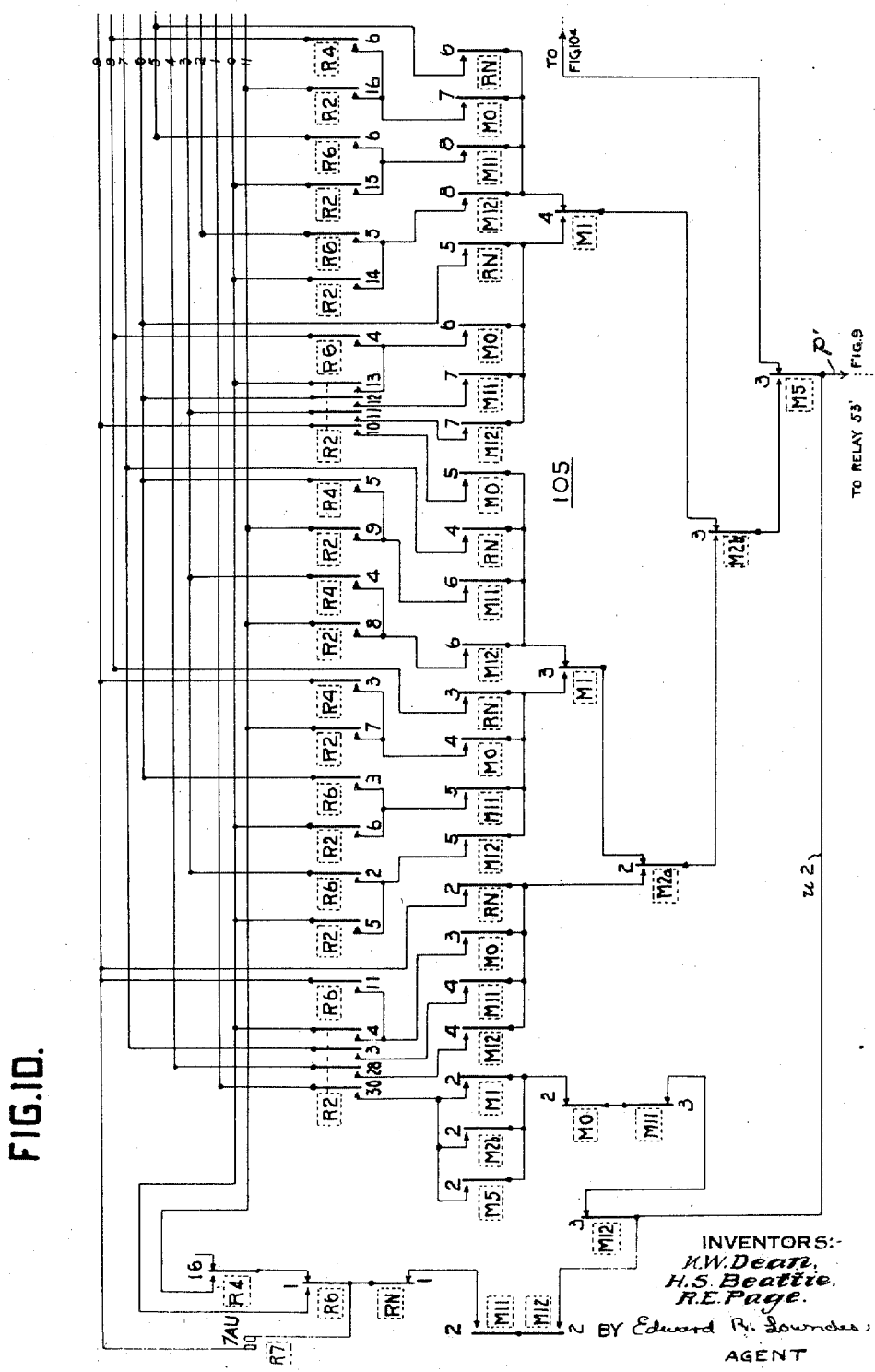

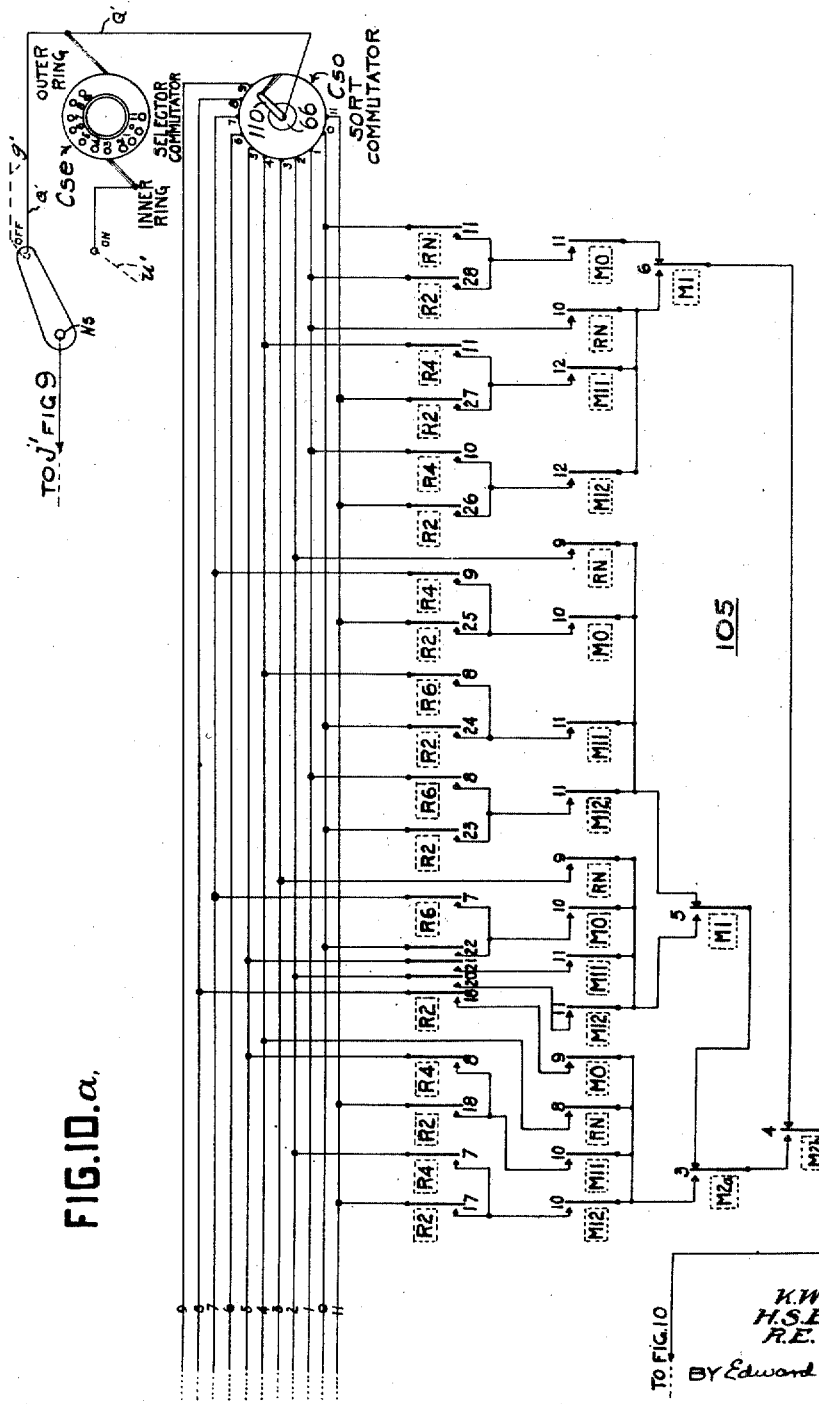

Nov. 28, 1950  K. W. DEAN ET AL  2,531,874
SORTING APPARATUS
Filed Dec. 17, 1945  7 Sheets-Sheet 7

INVENTORS
K.W. DEAN
H.S. BEATTIE
R.E. PAGE
BY
ATTY.

Patented Nov. 28, 1950

2,531,874

UNITED STATES PATENT OFFICE 2,531,874

SORTING APPARATUS

Kenneth W. Dean, Horace S. Beattie, and Ralph E. Page, Poughkeepsie, N. Y., assignors to International Business Machines Corporation, New York, N. Y., a corporation of New York Application December 17, 1945, Serial No. 635,599

8 Claims. (Cl. 209—110)

The present invention relates to sorting machines and, more particularly, to sorting machines of the type shown and described in the patents to Eugene A. Ford, Nos. 1,741,985 and 1,962,735, dated December 31, 1929 and June 12, 1934 respectively, both patents being for sorting machines. The invention further relates to a method of sorting record cards, which are punched with alphabetical designations, whereby a plurality of card-receiving pockets in a sorting machine are made available for reception of cards bearing certain selected alphabetical designations during an initial run of a group of cards through the machine. Also, during this run of the cards, a pair of additional pockets are made available for reception of cards not specifically selected and these latter cards are distributed or divided between the two additional pockets by a partial sorting operation, i. e., these cards are sorted into two groups, one group containing cards next to be run through the machine for specific sorting of cards bearing certain other selected alphabetical designations, and the other group containing cards finally to be run through the machine for specific sorting of cards bearing still other selected designations. The second group of cards contained in one of the two additional pockets, when run through the machine, are specifically sorted into groups and the various groups fall on top of the groups of cards previously placed in their respective pockets. Finally, when the third group of cards contained in the other additional pocket are run through the machine, they, too, are divided into groups which fall upon top of the groups obtained during the second run. After all cards have been run through the machine and sorted, according to the alphabetical designations thereon, the various groups of cards, each in an individual pocket, may be removed from the pockets sequentially and stacked one upon the other with the net result that all of the cards in the final stack will be arranged in alphabetical groups.

Throughout this specification and in the claims which follow, the terms "partial sorting" and "specific sorting" have, for lack of a better expression, been resorted to. It will be understood that by a partial sorting operation is meant the performance of sorting operations upon a group of cards which results in the distribution or division of these cards into two card-receiving pockets. One of these pockets receives cards bearing alphabetical designations which are equally alphabetically removed from each other and which are once removed from the designations of cards previously sorted during the first sorting operation. The other pockets receive cards which are twice removed from the cards of the first sorting operation and which are once removed from the cards resulting from the second sorting operation. The term "specific sorting" applies to the individual distribution of each card to one, and only one, pocket which is designed for reception thereof.

In carrying out the method involved, the improved sorting machine comprising the present invention is designed to accommodate perforated cards used in a tabulating system, such as the Hollerith system, but a somewhat modified form of card is employed. Whereas in the present-day conventional card a twelve-line code, consuming substantially the entire width of the card, is employed and allowing for eighty index point positions or columns, the modified card of the present invention utilizes a simple seven-line code with provision being made for selectively sorting in a plurality of different fields or regions of sorting in the card. Furthermore, the modified card employed in connection with the present invention has been designed to accommodate seventy index point positions or columns, although this latter feature is entirely arbitrary and, if desired, a greater or lesser number of columns may be employed.

In carrying out the present invention, the mechanical changes effected in sorters of the type disclosed in the above mentioned patents are relatively minor, as will appear presently when the nature of the invention is better understood. These changes consist mainly in eliminating one of the thirteen sorting pockets originally employed and, to accommodate this elimination, readjusting the position of the sorting magnet and armature knock-off device, while at the same time installing suitable card guides to hold the cards flat while traveling from the contact roll to and through the chute blades. Numerous electrical instrumentalities, however, have been added to the machine in such a manner that the same will perform the services required of them and, toward this end, throughout the following description emphasis will be placed particularly upon the electrical features involved, while an understanding of the mechanical features may readily be had by reference to the above mentioned patents.

According to the present invention, the machine employs twelve sorting pockets and may selectively be adjusted for sorting the cards according to perforations applied in any one of three fields or sorting regions. Where numerical sorting is concerned, a single run of a stack of cards through the machine will suffice and each of the ten pockets designed for numerical card reception will receive a card perforated with an individual numerical designation. Where alphabetic sorting is concerned, the initial stack of unsorted cards is fed through the machine and the machine will operate in such a manner that during this first run cards punched with certain selected characters of the alphabet will be sorted into different pockets; all numerically punched cards will be sorted into an individual pocket; all blank or unpunched cards will be sorted into an individual pocket, and all punched cards not selected during the first run will be partially sorted and divided into a pair of additional pockets. The partial sorting operation, whereby unselected cards are distributed into two pockets, consists in the placement of cards next to be run through the machine into one pocket and of cards to follow afterward through the machine into another pocket.

After this first sorting operation, the numerical cards may be removed from the machine and the groups of partially sorted cards again run through the machine in proper order for second and third run sorting operations. By placing one of the groups of sorted cards in the card feed hopper with the other group on top thereof, the second and third sorting operations may be performed as a single run, and during this run cards punched with additional selected characters of the alphabet will be sorted into the various pockets on top of the cards already received therein. During the latter part of this run, cards punched with still other selected characters in the alphabet will be applied to the pockets containing the previously sorted cards, thus completing all sorting operations.

Selection of alphabetically punched cards during the three sorting runs of the machine is so made that after sorting operations are complete the cards will rest in their respective pockets alphabetically or sequentially arranged in groups of three or less characters each. Furthermore, the character selection is so made that when the cards are removed as a group from their respective pockets without shuffling and placed one group upon another, the entire stack of cards so removed from the machine will be in proper alphabetic sequence.

The novel sorting process briefly outlined above depends in part for its successful operation upon the use of what is termed herein as a "signal card." This signal card is punched with special code perforations and the machine is so designed electrically that when it is encountered by the sorting brush certain machine change-over operations are automatically effected to distinguish the first sorting run from the second, and the second sorting run from the third. The signal card is handled in the machine in the ordinary process of sorting and is so applied to the initial stack of cards that it always presents itself for sensing at the appropriate time when machine change-over sorting operations are in order. When the sorting operations have finally been completed, this signal card will rest conveniently on top of the stack where it is readily accessible for removal purposes and application to a subsequent and unrelated sorting operation.

Because of the provision of this signal card which effects automatic machine sorting change-over operations, it is not necessary during actual operation of the machine to let the machine stop between the various groups of cards while sorting in any selected column of the card. Cards falling into the pocket which receives the unselected group of cards may be placed on top of the signal card, which in turn rests upon the top card in the previously sorted group, while the remaining cards of the first run of cards are still in the feed hopper. This expedient makes possible continuous machine operations with automatic switching over to the second group of cards when the signal card presents itself at the end of the first group sort, or switching over to the third group sort when the signal card is sensed at the end of the second group sort.

During sorting operations, the individual cards are passed through the sorting station face downward with the bottom longitudinal edge leading. Since a seven-line code is employed with the code columns extending transversely of the card and since a single sensing brush is employed which traverses the various perforations of each character in a single column, it is necessary, where plural perforations are concerned, to provide for storing the electrical impulses which are encountered in the sensing of a single character until such time as all the perforations of the character have been traversed by the sensing brush. To accomplish this and to make possible energization of the sorting magnet at the proper time for introduction of the card beneath the proper chute blade, certain electronic circuits are brought into play. These circuits each include a cold cathode type of electron flow initiating tube and an amplifying tube, together with a series of holding relays by means of which once an electronic circuit is completed by virtue of a perforation in the card being sensed, it will be maintained in existence until such time as all remaining perforations in the card have also been sensed. As each electronic circuit is completed, a pick-up relay magnet existing in the plate circuit of its respective amplification tube will become energized. Selective energization of these various latter relay magnets serves to operate a decoding device and this latter device in turn operates to select a single electrical circuit associated with a sort commutator, which commutator operates in such a manner as to energize the selected circuit at the proper time in the card cycle so that the proper chute blade will be actuated to receive the card. The sort commutator is mounted on a rotatable shaft, together with a number of additional commutators, all of which perform their respective and necessary functions at the proper time in the machine cycle to effect proper mechanical machine operations.

The machine also has associated therewith certain signal card control relay circuits which become effective when the signal card is encountered by the sensing mechanism to effect the necessary machine change-over operations previously outlined above.

While the mechanical arrangements of the present sorting machine are in many respects similar or identical with those of the machines shown in the above mentioned patents to Ford, the principle of machine operation differs quite materially from these structures. The patented structures and the present structure are all predicated upon the fact that a plurality of superimposed sorting blades form distributing passages for the cards. The receiving end of each of the blades is longer than the one below it and all of the blade ends rest upon a plate which is so positioned that the cards, while emerging from the analyzing device, pass between the blade ends and the plate. Means are provided for effecting a blade-lowering operation at the proper time in the machine cycle so that all of the blades, except those resting upon the card being analyzed, will be lowered to thereby open a passage for the card between two blades, the particular passage opened depending, of course, upon the longitudinal position of the card at the instant of lowering of the blades. In the patented structures, since the sorting magnet which causes lowering of the plate depends for its energization upon the flow of electric current through the holes or perforations appearing in the card at the sensing station, it is obvious that the time of energization of the magnet is dependent entirely upon one factor, namely, the relative location of perforations in the card undergoing sensing. For this reason, the decrement between adjacent pairs of blade ends must necessarily correspond to the interval between the index point positions of the perforations in a single card column. According to the present invention, the time of energization of the sorting magnet is entirely independent of the position of the index point positions in a column of the card. So long as the proper code positions are maintained, it makes no difference whether these perforations are widely spaced or whether they are close together. The cards are advanced toward and through the chute blades at a predetermined rate of speed in synchronism with an impulse distributor, which comprises the previously mentioned sort commutator. This sort commutator, rather than the locations of index point positions in the card, is the controlling factor which determines the proper time of opening of the sort magnet.

The provision of an apparatus of the character set forth above being the principal object of the invention, a further object thereof is to provide an apparatus of this character which is capable of operating at relatively high speeds and which, by virtue of the features set forth above, will effect complete alphabetic sorting of a group of cards in a relatively short period of time with a minimum of card handling operations.

A still further object of the invention is to provide in a machine of this character means whereby manual push button control of the machine is made available to accomplish the set-up functions of the signal card, if desired. By such an arrangement, the machine may be restored to any selected set-up for sorting operations if mechanically or electrically disturbed, as for example, by a card jam.

A still further object of the invention is to provide a machine of this character having associated therewith a series of signal devices for indicating to the operator of the machine the particular sorting set-up currently available and being employed by the machine.

Numerous other objects and advantages of the invention not at this time enumerated will become more readily apparent as the nature of the invention is better understood. In the accompanying seven sheets of drawings forming a part of this specification, one embodiment of the invention has been shown.

In the drawings:

Fig. 1 is a fragmentary sectional view taken substantially centrally and longitudinally through the card-receiving end of a sorting machine constructed in accordance with the principles of the present invention.

Fig. 2 is a sectional view taken substantially along the line 2—2 of Fig. 1.

Fig. 3 is a plan view, partially broken away, of a typical record card designed for use in connection with the present sorting machine.

Fig. 4 is a fragmentary plan view of a record card showing the same perforated with numerical designations according to a selected code.

Fig. 5 is a fragmentary view, similar to Fig. 4, showing the card perforated with alphabetical designations according to the selected code.

Fig. 6 is a fragmentary view of a card showing a special designation thereon indicating that it is a signal card for controlling certain machine operations.

Fig. 7 is a schematic view illustrating the placement of cards in their respective sorting pockets during various machine runs.

Figs. 8, 9, 10 and 10a, taken jointly, constitute an electrical circuit diagram for the machine.

Figure 11:
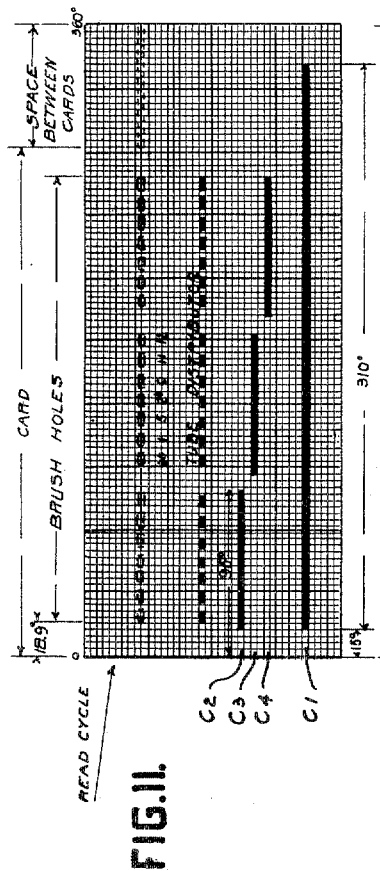

Fig. 11 is a time chart illustrating the passage of a card through the machine.

Figure 12:
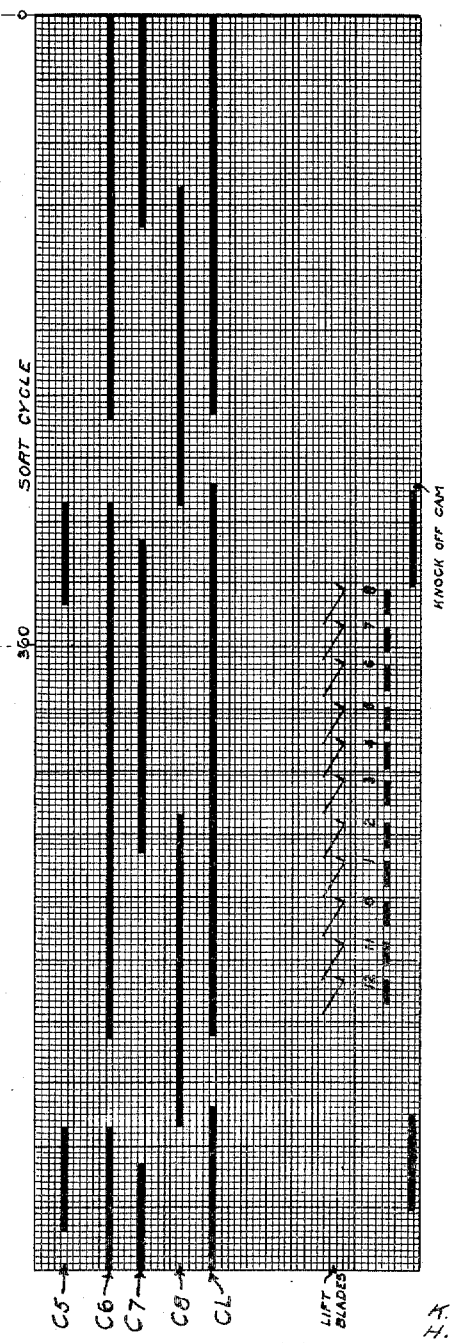

Fig. 12 is a time chart showing the various machine operations during a sort cycle.

In all of the above described views like characters of reference are employed to designate like parts throughout.

THE RECORD CARD

In order that the operation of the present sorting machine may be fully understood, there is shown in Fig. 3 a typical unpunched record card on which there has been printed or otherwise marked the various index point positions arranged in columns where perforations, according to a selected code, may be applied. In Figs. 4 and 5 the selected code is illustrated, the former showing numerical designations and the latter showing alphabetical designations. As indicated by the legending in these figures, each card is designed to accommodate seventy columns, although it will be understood, of course, that a greater or lesser number of columns may be employed, if desired. As shown in Fig. 3, there are three sorting fields on each card which, for convenience of description, have been labeled #1 deck, #2 deck and #3 deck. The machine is so designed that it may be set for selective sensing of a group of cards in any one of the three sorting decks and thus, if desired, each deck in a certain group of cards may be employed for conveying information of a different character. Each column in a particular sorting field or deck includes a straight-line series of seven index point positions. These position have been labeled 12, 11, 0, 2b, 5, 1 and 2a (see Fig. 4) to agree with a selected binary code system, the nature of which will become clear presently. In this code system the positions 12, 11 and 0 are zone positions, while the positions 2b, 5, 1 and 2a are numeric positions predicated upon an additive binary code system.

THE CODE

The specific code employed for numerical designations is as follows:

| Numeral | Punched |
| --- | --- |
| 0 | 0 |
| 1 | 1 |
| 2 | 2b |
| 3 | 1, 2b |
| 4 | 2b, 2a |
| 5 | 5 |
| 6 | 5, 1 |
| 7 | 5, 2b |
| 8 | 5, 2b, 1 |
| 9 | 5, 2b, 2a |

The specific code employed for alphabetical designations is as follows:

| Letter | Punched |
| --- | --- |
| A | 12, 1 |
| B | 12, 2b |
| C | 12, 2b, 1 |
| D | 12, 2b, 2a |
| E | 12, 5 |
| F | 12, 5, 1 |
| G | 12, 5, 2b |
| H | 12, 5, 2b, 1 |
| I | 12, 5, 2b, 2a |
| J | 11, 1 |
| K | 11, 2b |
| L | 11, 2b, 1 |
| M | 11, 2b, 2a |
| N | 11, 5 |
| O | 11, 5, 1 |
| P | 11, 5, 2b |
| Q | 11, 5, 2b, 1 |
| R | 11, 5, 2b, 2a |
| S | 0, 2b |
| T | 0, 2b, 1 |
| U | 0, 2b, 2a |
| V | 0, 5 |
| W | 0, 5, 1 |
| X | 0, 5, 2b |
| Y | 0, 5, 2b, 1 |
| Z | 0, 5, 2b, 2a |

THE SIGNAL CARD

In Fig. 6 there is disclosed a signal card which is of standard Hollerith dimensions and which has been punched in the 12 and 11 index point positions of each deck. This signal card, as will be made clear hereinafter, is designed to control certain machine functions and operations at the completion of each card run.

SORTING OPERATIONS (NUMERICAL)

Referring now to Fig. 7 wherein the various sorting pockets or receptacles are diagrammatically illustrated, it will be seen that the machine is equipped with twelve such pockets, as distinguished from the usual thirteen pockets associated with the machines of the above mentioned patents of E. A. Ford. These pockets have been labeled 9, 8, 7, 6, 5, 4, 3, 2, 1, 0, 11 and R. In the operation of the machine, if a numerical sorting operation is to be effected, the machine may be conditioned in a manner subsequently to be described, so that if a group of cards are run through the machine each numerically punched card will be sorted into the pockets, as diagrammatically illustrated below:

| Pocket | 9 | 8 | 7 | 6 | 5 | 4 | 3 | 2 | 1 | 0 | 11 | R |
| --- | --- | --- | --- | --- | --- | --- | --- | --- | --- | --- | --- | --- |
| Cards | 9 | 8 | 7 | 6 | 5 | 4 | 3 | 2 | 1 | 0 |  | Blanks |

This is a standard method of sorting and the manner in which such sorting is accomplished is fully described in the above mentioned patents to Ford.

SORTING OPERATIONS (ALPHABETICAL)

Where alphabetical sorting is concerned, a signal card is punched in the 12 and 11 index point positions of each of the three sorting regions or decks and is placed on top of a stack of cards to be fed to the machine. The cards are then passed through the machine and they will be sorted into the various pockets as indicated below:

| Pocket | 9 | 8 | 7 | 6 | 5 | 4 | 3 | 2 | 1 | 0 | 11 | R |
| --- | --- | --- | --- | --- | --- | --- | --- | --- | --- | --- | --- | --- |
| Cards | X | U | R | O | L | I | F | C | Num. | 3rd group | Signal card 2nd group | Blanks |

From the above chart, it will be seen that during this first run of the cards any numerical cards in the stack will be conducted into the 1 pocket. Any blank cards or cards which are not punched in the localized region thereof undergoing sensing will be rejected or, in other words, conducted to the R pocket. The remaining unsorted cards possessing character designations not indicated in the chart above will be conducted in part to the 0 pocket and in part to the 11 pocket, a partial sort being made during the first run wherein these cards are divided into a second group for immediate return to the machine, and into a third group for a subsequent return to the machine.

During this initial run of the cards, the signal card carried at the end of the run, when sensed by the sensing brush, serves to electrically condition the machine for the run next to follow. In so conditioning the machine, the function of certain decoding relays are altered, so that during the next run cards bearing different alphabetical designations from those previously run will be distributed in a predetermined manner to their respective sorting pockets.

The next step in the sorting operation is to remove the numerically punched cards from the 1 pocket and set them aside. Thereafter, the second group of cards contained in the 11 pocket with the signal card on top thereof is placed in the card feed stack and, after passing through the machine, the pockets of the machine will contain cards as designated below:

| Pocket | 9 | 8 | 7 | 6 | 5 | 4 | 3 | 2 | 1 | 0 | 11 | R |
| --- | --- | --- | --- | --- | --- | --- | --- | --- | --- | --- | --- | --- |
| Cards | Y | V | S | P | M | J | G | D | A | Signal card |  |  |
| Do | X | U | R | O | L | I | F | C |  | 3rd Group |  | Blanks |

It is to be noted that during this second run the signal card at the end of the run falls in the 0 pocket on top of the third group of cards next to be passed through the machine. As this signal card is sensed during this run, certain decoding relays are conditioned to prepare the machine for the next run.

The final step in sorting the cards is to remove the third group of cards from the 0 pocket and run the same through the machine, the signal card resting on top of the cards. When this operation is completed, the pockets will contain cards as indicated below:

| Pocket | 9 | 8 | 7 | 6 | 5 | 4 | 3 | 2 | 1 | 0 | 11 | R |
|---|---|---|---|---|---|---|---|---|---|---|---|---|
| Cards | (Signal card) Z | W | T | Q | N | K | H | E | B |  |  | Blanks |
| Do | Y | V | S | P | M | J | G | D | A |  |  |  |
| Do | X | U | R | O | L | I | F | C |  |  |  |  |

It is to be noted that after this run is completed, the signal card is disposed in the 9 pocket on top of the stack of cards contained therein. In passing through the sensing station during this run the signal card is designed to condition the machine for a complete new run of cards in the same column. If these cards are to be sensed in the next adjacent column or, in fact, in any column other than the column in which sensing operations originally took place, means are provided for shifting the sensing brush to the desired column in a manner that will appear presently.

The cards are finally removed from the pockets sequentially and when properly stacked they will be found to be in correct alphabetical order with the signal card resting on top of the stack.

During actual sorting operations, the machine does not necessarily cease to function between the various groups of cards while sorting in any one column. The cards which fall in the 11 pocket may be placed on top of the signal card in the feed stack while the remaining cards of the first sorting run are still being fed. In this manner, continuous machine operation is made possible with automatic switching over to the second group sort when the signal card passes the sensing station. When the last card in the second group of cards has been disposed in the 11 pocket, the signal card will fall on top of it. These cards are then placed in the feed hopper and the cards from the 0 pocket are placed on top of them. When the signal card is again encountered at the sensing station, the machine will sort the third group of cards into the proper pockets and the signal card will be conducted to the 0 pocket. The signal card may then be placed on top of the last card in the feed stack to automatically set the machine up for a subsequent sorting operation or it may be left in the 0 pocket until all of the pockets have been emptied.

The machine is designed for push button control whereby the automatic operations ordinarily performed by the signal card may be manually resorted to. This push button control may also be employed to return the machine to its proper sort set-up if it is disturbed by virtue of a card jam. Any existing machine set-up is adapted to be indicated by signal lights, in full view of the operator, which will be described subsequently.

BRIEF DESCRIPTION OF THE MACHINE

Having described the purpose of the present sorting machine and the manner in which the novel type of perforated cards are ultimately sorted so as to become arranged alphabetically, a brief description of the machine itself and its mode of operation will now be given. For a more complete description of a machine of this general type, reference may be had to either of the above mentioned Ford patents or, in addition, to the U. S. patent to Cyril Horsfield, No. 1,933,328, dated October 31, 1933, for a sorting machine. The numeral 10 in Fig. 1 designates generally a feed hopper or magazine adapted to receive the cards C which are of the character briefly described above. The cards are retained in their proper stacked position by means of vertical guides 12 attached to the main frame 13 of the machine. The cards are advanced one at a time into a position where they may be picked up or gripped by the feed rolls 14 by means of a picker blade 15. The picker blade 15 is carried by a member 16 adapted to be reciprocated by an arm 17 mounted for rocking movement on a shaft 18 and connected by means of a link 19 to a crank pin 20 carried by a crank (not shown in the drawings) mounted on a shaft 21. From the above description, it will be clear that each revolution of the shaft 21 will cause the arm 17 to be rocked about the axis of the shaft 18 to thereby move the member 16 so as to successively advance the cards C toward the feed rolls 14, which thereafter grip the cards and feed them past the sensing station. The feed rolls 14 bring each card fed by the member 16 into a position to be traversed or sensed by a brush 22 carried in a brush holder 24. The brush holder 24 is carried by and insulated from a carrier 26 which is adapted to be adjusted by means of a screw 28 extending transversely of the machine and capable of being turned manually by means of a handle (not shown) so as to bring the brush 22 into a position to sweep over or sense any selected column of the seventy card columns associated with each individual card. The brush 22 is electrically connected to an insulated contact rail 30 extending beneath and parallel to a shaft 32 projecting transversely of the machine. A suitable spring-actuated contact shoe 34 provides means for maintaining a circuit to the brush, regardless of the column on the card with which the brush has been brought into cooperative relation. The sensing brush 22 is designed for cooperation in the usual manner with a contact roll 23 which is positioned therebelow and over which the cards are adapted to pass. The contact roll 23 is adapted to be driven in unison with rollers 36 in the conventional manner. The brush holder 24 and the means for adjusting it to a desired column form no part of the present invention and have merely been briefly mentioned herein. For a full understanding of the nature and operation of the brush and its holder, reference may be had to the above mentioned Horsfield patent.

Before each card leaves the control of the feed rolls 14, it is gripped by the rollers 36, while still other rollers 38, which are driven in unison with the feed rolls 14 and 36, serve to advance the cards through the machine to the left, as viewed in Fig. 1. The shafts which support all of the various rollers are driven in unison with the shaft 21 by means of a common shaft (not shown), which is in turn driven by an electric motor, shown at M in Fig. 8 but which does not appear in Fig. 1, in a well known manner.

Each card as it is sensed by the brush 22 moves over a pair of plates 40 mounted in spaced relationship upon the main frame 13 of the machine and the left edge of the card passes underneath the ends of a series of guide or chute blades 42 which lead to a series of card-receiving receptacles or pockets, one of which is shown at 44, and which pockets are adapted to receive cards therein having similar index perforations in the column undergoing sensing. One of the pockets is commonly known as the reject pocket (see also Fig. 7) and is accordingly labeled R, the function of this pocket having previously been outlined. The ends of the blades are substantially narrowed or reduced in width at their right-hand ends and are bent upwardly as at 46 to permit the cards to slide under the ends of the blades. Each end rests upon a narrow plate which constitutes part of a spring-pressed armature 48 which is pivoted on a knife edge formed on the upper edge of a plate 50 mounted upon the machine frame. A spring 52 normally holds the armature away from the poles of a sort magnet 53 so that the upturned ends 46 of the blades 42 are presented to the edge of the card as it is advanced by the rolls 14 toward the left and away from the brush 22.

It should be understood that the left or leading edge of the card will pass beneath the upturned ends 46 of each of the blades 42 as the card is advanced through the machine by the feed rollers, and after the brush 22 has traversed or sensed a series of code perforations in the column undergoing sensing and certain decoding operations, the nature of which will be made clear presently, have taken place, the magnet 53 will be energized and the armature 48 will be attracted, thereby lowering all of the ends 46 which do not overlie the card. As a result, the card analyzed will enter one of the spaces existing between the ends of adjacent blades 42 and will thereafter be carried to the appropriate receiving pocket by the various driving rollers 38 according to the positions and coding of the index points sensed by the brush 22.

Much of the foregoing may be clearly understood by reference to the three previously mentioned patents which give a more detailed description of the construction and operation of the mechanism for diverting cards to the proper receiving station or pocket.

Suitable card guides 54 and transverse supporting members 56 therefor are provided for retaining the transverse edges of the cards in position during feeding thereof through the machine so that they may pass to the chute blades in a substantially flat condition.

Referring now to Fig. 2, in addition to Fig. 1, the right-hand end of the shaft 21, as viewed in Fig. 2, has affixed thereto a gear 58 which is rotated by a worm gear 60 mounted on a shaft 62 driven by the shaft of the sorter motor M (Fig. 8) in any suitable manner. The worm gear 60 serves to drive a gear 64 carried at the upper end of a vertical shaft 66. The shaft 66 projects into a commutator casing 68 and is journaled as at 70 in one end thereof. The shaft 66 serves to carry a series of commutators and distributors, the nature and function of which will become clear when the electrical features of the invention are discussed. For the present, it is deemed sufficient to say that various instrumentalities contained within the casing 68 include a tube distributor TD, a series of eight commutators labeled C1, C2, C3, C4, C5, C6, C7 and C8, a selector commutator Cse and a sort commutator Cso. In the description of electrical features to follow, the mechanical construction, as well as the electrical function of these various distributors and commutators, will become apparent and, therefore, it is thought that a detailed description thereof at this time is rendered unnecessary.

CIRCUIT DESCRIPTION AND MACHINE OPERATION

Motor circuit, stop and start circuits

Referring now to Figs. 8, 9 10 and 10a wherein the electrical diagram for the machine is shown, a source of current supply is shown at S and is adapted to supply current to the sorter motor M. Power from the source is made available for machine operations by means of a master switch MS. After the master switch MS has been closed, upon depression of a start key 100 a pair of contacts c1 become momentarily closed, thus energizing a card control relay magnet RX and a pair of motor control relay magnets RM1 and RM2, the latter magnets operating to close respective pairs of contacts c2 and c3 to energize the motor M, the circuit for the motor existing from the negative side of the source S through wire a, contacts c3, motor M, contacts c2, and wire b to the source. When the first card is fed from the feed hopper 10, it closes the usual card lever contacts CL2 and thus a holding circuit is created for the two magnets RM1 and RM2 and the card control relay magnet RX. This circuit exists from the negative side of the source S through wires c, d, magnets RM2, RM1 and RX, normally closed contacts c4 under the control of the stop key 102, a pair of pocket stop contacts c5, card lever contacts CL2, and wires e, f and g to the positive side of the line. The pair of card lever contacts CL2 do not become open during the passage of successive cards through the machine and thus the motor circuit just described will be maintained until at least one of the pockets 44 becomes filled to open its respective pair of pocket stop contacts c5 or until the stop key 102 is depressed to open the contacts c4, or until the stack of cards has been completely sorted so that the machine will stop under the control of the signal card.

Electronic tube circuits

As previously indicated, the machine has associated therewith a plurality of electronic tube controlled relay circuits. The various electronic tubes and other electrical instrumentalities may conveniently be enclosed within a casing (not shown) suitably disposed within the framework 13 in the lower regions of the machine. In Fig. 8 there is shown a series of seven electronic tubes labeled T12, T11, T0, T2b, T5, T1 and T2a. These tubes are of the cold cathode Thyratron type. A second series of tubes labeled T'12, T'11, T'0, T'2b, T'5, T'1 and T'2a serve as amplifiers and have disposed in their plate circuits respective pick-up relay magnets M12, M11, M0, M2b, M5, M1 and M2a. The tubes of this latter group are preferably beam power amplifier tubes. Parallel circuits exist to all of the tubes, except insofar as their filament connections are concerned.

When the master switch MS is closed, a circuit will be completed from the negative side of the source S through wires c, h, i, variable resistor r1, wires j, k, resistor r2, wires l, m, n, o, p, q, r and g to the positive side of the source. A circuit is also completed from the negative side of the source through wires c, h, i, variable resistor r3, the filaments of tubes T'2a, T'1, T'5, wires s, t, n, o, p, q, r and g to the positive side of the source.

The current supplied by the source S is preferably direct current at a potential of 110 volts.

The variable resistor $r3$ is adjusted so that there will be a 75 volt drop across the three series-arranged filaments of the tubes just mentioned, thus satisfying the electrical requirements for the filaments of these tubes. It is obvious that if the source maintains a higher or lower potential, the rating of the resistor $r3$ and other resistors associated with the tubes will be varied to accommodate the tube requirements.

Still another circuit exists from the negative side of the source through wires $c$, $h$, $i$, resistor $r1$, wires $u$ and $v$, the filaments of tubes $T'2b$, $T'0$, $T'11$, $T'12$, wires $w$, $t$, $n$, $o$, $p$, $q$, $r$ and $g$ to the positive side of the line. The variable resistor $r1$ is adjusted so that there will be a 100 volt drop across the series-arranged filaments of the four last mentioned tubes to satisfy the 25 volt requirement of each of these tubes.

All of the cathodes of the amplifier tubes are connected in parallel by means of a wire $x$ to the wire $u$ and, as a consequence, a negative operating bias is applied to the cathodes of these tubes from the source S through the wires $c$, $h$, $i$, resistor $r1$, and wires $u$, $x$, the resistor $r1$ serving as a voltage divider in the conventional manner.

When the sensing brush 22 is out of contact with the contact roll 23, as for example, when it is separated therefrom by an imperforate portion of a card, circuits will be established from the negative side of the source S through wires $c$, $h$, $y$, resistors $r4$, $r5$ to the starting anode of the selected Thyratron type tube. A circuit will also exist from the source through wires $c$, $h$, $y$, resistors $r6$, $r7$ to the control grid of the associated amplifier tube. The two circuits described above serve to impress a negative voltage on the starting anode of the Thyratron type tube and on the control grid of the amplifier tube.

It has previously been pointed out that the various commutators C1 to C8 inclusive, as well as the selector commutator Cse, the sort commutator Cso and tube distributor TD are mounted upon the common shaft 66 and are adapted to be actuated in unison. As may be determined from an inspection of Figs. 11 and 12, the commutator C1 is adapted to close its circuit at 15 degrees in the machine cycle and at this time a circuit will exist from the positive side of the line through wires $g$, $r$, $q$, $p$, $o$, commutator C1, wire $z$ to the another of the Thyratron type tube. The various screen grids of the amplifier tubes are connected to the positive side of the line through a circuit existing from this side of the line through wires $g$, $r$, $q$, $p$, $o$, $n$, $t$, wire $a'$, and resistor $r8$. Since there is thus a full line voltage negative charge on the starting anodes of the Thyratron type tubes, these tubes will conduct no current when the sensing brush 22 is not in register with the perforation in the card. Also, since there is a full line voltage negative charge on the control grids and a somewhat lesser negative charge on the cathodes of the amplifier tubes, these tubes will conduct no current. As a consequence, none of the pick-up relay magnets M12, M11, M0, M2b, M5, M1 or M2a will become energized when such energization is made potentially available by the commutator C5 which establishes its circuit at 280 degrees in the machine cycle.

When the sensing brush 22 encounters a perforation in a card, thus enabling it to make contact with the contact roll 23, a circuit is completed from the positive side of the line through wires $g$, $r$, one of the commutators C2, C3 or C4, depending upon the setting of the deck selector switch Sd, and from the switch Sd through the wire $b'$, card lever contacts CL3, contact roll 23, tube distriubtor TD, wire $c'$, resistor $r4$, wires $y$, $h$ and $c$ to the negative side of the source S. Under these conditions, the starting anode of the Thyratron type tube will attain full line positive voltage through the resistor $r5$ and the tube will be ionized, thus establishing an electronic circuit from the negative side of the source S through wires $c$, $h$, $y$, resistor $r6$, cathode-to-anode path through the Thyratron type tube, wire $z$, commutator C1 and wires $o$, $p$, $q$, $r$ and $g$ to the positive side of the source. As long as the commutator C1 remains in its circuit establishing condition, the circuit just traced will remain effective. Thus the impulse established at the sensing brush 22 will in effect remain stored in the apparatus until such time as the commutator C1 breaks at 325 degrees in the machine cycle, as shown in the timing chart of Fig. 11. For convenience of description, the points at which each of the commutators C1 to C8 inclusive establishes or discontinues its circuit has been applied in the form of legending in the drawings.

The card lever contacts CL3, mentioned in the preceding paragraph, become effective as a card enters the analyzing or sensing station. The tube distributor TD, also mentioned in the preceding paragraph, is mechanically of conventional design and electrically includes a distributor arm or rotor 104 which rotates with the shaft 66 and is adapted in passing to make contact successively with three series of contact groups corresponding to the deck commutators C2, C3 and C4, each group including seven distributor points which have been labeled in the drawings to correspond to the selected code $2a$, $1$, $5$, $2b$, $0$, $11$ and $12$.

It will be understood, of course, that the distributor arm or rotor 104, which is mounted on the shaft 66 of the tube distributor TD, is maintained in synchronism with the movements of the card through the sensing station and will establish contact with the various distributor points in such a manner as to direct the electrical impulses to the proper impulse storing tubes at the time a corresponding perforation is sensed by the sensing brush 22 in accordance with the selected code.

Upon flow of current through the selected Thyratron type tube, the negative voltage on the control grid of its associated amplifier tube will be lowered by the voltage drop across the resistor $r6$. Thus when the commutator C5 establishes its circuit at 280 degrees in the machine cycle, a circuit will exist from the negative side of the line through wires $c$, $h$, $i$, resistor $r1$, wires $j$, $u$, $x$, through the cathode-anode path of the amplifier tube, one of the relay pick-up magnets M12, M11, etc., commutator C5 and wires $m$, $n$, $o$, $p$, $q$, $r$, $g$, to the positive side of the line. Parallel circuits exist for every perforation in each column of the card. For example, if the character "1" is sensed at the sensing station, the tubes T12, T5, T2b and T2a will be ionized in rapid succession by means of the tube distributor TD and the corresponding amplifier tubes $T'12$, $T'5$, $T'2b$ and $T'2a$ will pass current through the relays M12, M5, M2b and M2a. It will be remembered that as each of the Thyratron type tubes becomes energized, holding circuits are established and thus ultimately all of the selected tubes remain ionized until such time as the commutator C1 breaks its circuit at 325 degrees in the machine cycle. As will be pointed out presently, energization of one or more of the relays R12, R11, etc., operates through a decoding device 105 (see Fig. 10) to select for actuation a single chute blade.

The various relays R12, R11, etc., are maintained energized until such time as the commutators C1 and C5 become inoperative at 325 degrees in the machine cycle. At this time, all tubes will drop out of the circuit, but certain holding relays will be maintained up through 230 degrees of the next machine cycle. The nature of these holding relays will be discussed subsequently.

For convenience and conformity of description, the various pick-up magnets have been identified on the drawings by legending wherein the letter P is associated with each magnet in addition to the regular identifying character. Similarly, the various holding magnets have been identified by the application thereto of the letter H apart from the regular designation of these magnets.

The various vacuum tube circuits previously described are more or less conventional in their design and no claim is made herein to any novelty in connection with these circuits per se. The specific use, however, to which these circuits are put in connection with the present sorting apparatus forms a part of this invention, inasmuch as extreme stability, positiveness and speed of operation is thereby attained. The Thyratron type tubes are designed to initiate their circuit functions in approximately .002 second and this is made possible by the use of suitable condensers 106 in conjunction with the resistors r5. These latter resistors provide stability of operation by limiting the flow of current in the starting anode circuits. The resistors r4 serve to limit the flow of current in the sensing brush circuit. The resistors r6 limit the flow of current through the Thyratron type tube. The resistors r7 limit the flow of current in the control grid circuit of the amplifier tubes. The resistors r8 limit the flow of current in the shield grid circuit of these latter tubes.

As the following description ensues, the specific tube circuits will not be followed in detail, it being understood that upon initiation of the action of each Thyratron type tube its respective pick-up relay in the plate circuit of a corresponding amplifier tube will become energized.

From the above description, it will be seen that the Thyratron type tubes are possessed of dual functions, which are, namely, to initiate an impulse upon sensing of a particular perforation in the card and to retain or store this impulse until all decoding operations have been completed or until the commutators C1 and C5 drop out their respective circuits at 325 degrees in the machine cycle.

*Card relay hold circuits*

The holding circuits previously mentioned may be traced with reference to Figs. 8, 9, 10 and 10a. Upon energization of one of the pick-up magnets M12, M11, M0, etc., in the plate circuits of the amplifier tubes, as for example, the magnet M12 at 280° in the machine cycle, its pair of 1 contacts (Fig. 9) become closed, thus completing a circuit from the negative side of the line through wire d', hold winding of the magnet M12, 1 contacts of the magnet M12, common wire i', commutator C6 (now operative), wire k', and (Fig. 8) wires m, n, o, p, q, r, g, to the positive side of the line. The above circuit is maintained energized until the commutator C6 destroys the circuit at 230° in the machine cycle. The above distribution of pick-up and hold circuits has been made specfically in connection with energization of the tubes T12 and T'12 upon sensing of a perforation in the 12 code position of the card. It will be understood, of course, in connection with the remaining code positions that similar circuits will exist. Thus upon energization of any of the remaining magnets in the plate circuits of the amplifying tubes various holding circuits, similar to those just described, are established and are maintained until 230° in the machine cycle.

The card relay magnets just referred to, and which appear in Figs. 10 and 10a, are in the form of contact closing magnets associated with an electrical decoding system 105 of the type commonly known in the art as the Baudot system. The purpose of the Baudot type decoding system shown in Figs. 10 and 10a is to decode the coded information sensed in a column of a card passing through the sensing station, as evidenced by energization of one or more of the card relay magnets, and convert this information into (where numerals are concerned) the decimal system by energization of one, and only one, of a series of ten electrical circuits, each representative of an individual numeral, or energization of an additional circuit by means of which cards not perforated with a numeral designation will be sent to the reject pocket R. Where alphabetical designations are concerned, these eleven circuits are sufficient inasmuch as three sorting runs are resorted to and inasmuch as the cards, during these runs, are distributed into eleven of the sorting pockets. Unpunched cards will, of course, be sent to the reject pocket R, inasmuch as none of the pick-up magnets will be energized and the action of the decoder of Figs. 10 and 10a will not be brought to bear.

SIGNAL CARD CONTROL RELAY CIRCUITS

*Numerical sorting*

For the decoding of a single numerical character, a numerical sort switch NS (Figs. 9 and 10a), which is a double pole switch, is thrown to the "on" position and a circuit will be completed from the negative side of the line through wire d', pick-up magnet RN, wire u', numerical sort switch NS ("on" position), wire j', (see both Figs. 8 and 9 and wires f and g to the positive side of the line. A parallel circuit exists for a signal lamp ln associated with a lamp housing 108 (Fig. 1) suitably mounted on the machine and by means of which the operator is informed that numerical sorting operations are in effect. This circuit will become effective upon movement of the numerical sort switch NS to its "on" position and will remain in effect as long as this switch stays in this position.

The specific nature and operation of the decoder mechanism of Figs. 10 and 10a will be described subsequently and at present it is deemed sufficient to state that this mechanism includes a series of labyrinth circuits, all of which are arranged in series with the sort magnet 53 and which lead to the sort commutator Cso. The sort commutator is correlated in its movements with the movements of the cards through the machine and includes a rotary arm or brush 110 designed to traverse a series of contact points associated with the various output circuit wires of the decoding device 105. These contacts are traversed in timed relation with the movement of the card and when the rotary contact brush 110 establishes an electric circuit, immediate energization of the sort magnet 53 will occur and at the proper time so that the corresponding chute blades 42 will be depressed to permit passage of the card to its assigned pocket.

Alphabetic sorting

FIRST SORT

For sorting characters of an alphabetic designation, the numerical sort switch NS (Fig. 9) is moved to its "off" position, thus closing an electrical circuit leading from the negative side of the line through wire $d'$, pick-up magnet R1, normally closed contacts 5BL, normally closed contacts 3BL, wires $s'$, $z'$, numerical switch NS ("off" position), wires $j'$, $f$, $g$ (Fig. 8) to the positive side of the line. Upon energization of the magnet R1, its pair of contacts 1AU become closed to establish a holding circuit through wire $d'$, holding magnet R1 (Fig. 9), its contacts 1AU, normally closed contacts 3AL, wires $y'$, $z'$, numerical switch NS ("off" position), and wires $j'$, $f$, $g$, to the positive side of the line. A signal lamp La1 exists in parallel with the holding magnet R1.

A pick-up magnet R2 is arranged in parallel with the holding magnet R1, the circuit for this magnet existing from the negative side of the line through wire $d'$, magnet R2, contacts 1AU and 3AL, wires $y'$, $z'$, numeric switch NS ("off" position), and wires $j'$, $f$, $g$, to the positive side of the source. A holding magnet R2 is adapted to become energized when the commutator C7 establishes its circuit. This circuit exists from the negative side of the line through wire $d'$, holding magnet R2, its contacts 1, wires $l'$, $f'$, normally closed contacts 8AU, commutator C7, wire $g'$, numerical switch NS ("off" position), and wires $j'$, $f$, $g$, to the positive side of the source. This last circuit becomes effective at 302° in each machine cycle and is discontinued at 122° in each succeeding cycle. A signal card which, as shown in Fig. 6, is perforated in the 12 and 11 zone positions will pass to the sensing station immediately after passage of the last card in the first group of sorted cards. The sensing brush 22 will thus serve to close circuits which are operable to energize the pick-up magnets M12 and M11 (top of Fig. 8) when the commutator C5 establishes its circuit at 280°. Energization of the pick-up magnets M12 and M11 will cause closure of their 13 contacts respectively (Fig. 9). When the commutator C7 closes its circuit at 302°, pick-up relay magnet R3 will become energized, the circuit therefor existing from the negative side of the line through wire $d'$, pick-up magnet R3, 13 contacts of magnet M12, 13 contacts of magnet M11, contacts 7AL, 1 contacts of magnet R2, wires $l'$, $f'$, normally closed contacts 8AU, commutator C7, wire $g'$, numerical switch NS ("off" position), and wires $j'$, $f$, $g$, to the positive side of the source.

Upon energization of the pick-up magnet R3 (Fig. 9) its contacts 3AU establish a holding circuit therefor, this circuit existing from the negative side of the line through wire $d'$, holding magnet R3, contacts 3AU now closed, normally closed contacts 5AL, wires $x'$, $y'$, $z'$, numeric switch NS ("off" position), and wires $j'$, $f$, $g$, to the source. This latter described holding circuit also serves to energize pick-up magnet R4, together with holding magnet R4, when the 1 contacts of pick-up magnet R4 become closed. The pair of contacts 3BL, upon becoming open, serve to deenergize pick-up magnet R1. The pair of contacts 3AL upon opening serve to deenergize the holding magnet R1 and pick-up magnet R2. When the commutator C7 opens its circuit at 122° the circuit through the holding magnet R2 is broken and the circuit through the pick-up magnet R3 is opened. Closure of contacts 3AU serves to establish a circuit through the second sort signal lamp La2.

SECOND SORT

The cards which are distributed into the 11 pocket (Fig. 7) are removed from the machine and placed in the feed hopper 10 and the second sorting operation commences. At the completion of this sorting operation the signal card will again cause the magnets M11 and M12 (Fig. 8) in the plate circuits of the amplifier tubes T'11 and T'12 to become energized at 280° in the machine cycle when the commutator C5 becomes effective. This serves to close the 14 points (Fig. 9) of these magnets respectively. When commutator C7 becomes effective at 302° in the cycle a circuit will be established through wire $d'$, pick-up magnet R5, 14 points of magnets M12 and M11 respectively, normally closed 2 contacts of magnet R2, 1 contacts of magnet R4, wires $m'$, $f'$, normally closed contacts 8AU, commutator C7, wire $g'$, numerical sort switch NS and wires $j'$, $f$, $g$, to the source.

Closure of the contacts 5AU establishes a holding circuit for the magnet R5. This circuit exists from the source through wire $d'$, holding magnet R5, contacts 5AU, normally closed contacts 7BL, wires $w'$, $x'$, $y'$, $z'$, numerical sort switch NS ("off" position), and wires $j'$, $f$, $g$, to the source. Closure of the pair of contacts 5AU serves to close a parallel circuit through the signal lamp La3, and also serves to energize pick-up magnet R6 through a circuit leading from the source through wire $d'$, magnet R6, contacts 5AU, contacts 7BL, wires $w'$, $x'$, $y'$, $z'$, numerical switch NS, and wires $j'$, $f$, $g$, to the source. Opening of the contacts 5BL serves to cause deenergization of the pick-up magnet R1 (Fig. 9). Opening of the contacts 5AL serves to deenergize the holding magnet R3 and also pick-up magnet R4. When the commutator C7 opens its circuit at 122° in the machine cycle, holding magnet R4 and pick-up magnet R5 are deenergized.

THIRD SORT

Cards which during the second sorting operation have been sent to the 0 pocket (Fig. 7) are now placed in the feed hopper 10 with the signal card on top and the third sorting operation is commenced.

At the completion of this sorting operation when the commutator C5 closes its circuit at 280°, the pick-up magnets M12 and M11 (Fig. 8) will again become energized, thus closing their 15 contacts respectively. When commutator C7 (Fig. 9) becomes effective at 302° in the cycle, pick-up magnet R7 (Fig. 9) will become energized by virtue of a circuit existing from the source through wire $d'$, pick-up magnet R7, 15 contacts of magnets M12 and M11 respectively, 2 contacts of magnet R4, 12 contacts of magnet R6, wires $m'$, $f'$, normally closed contacts 8AU, commutator C7, wire $g'$, numerical sort switch NS and wires $j'$, $f$, $g$, to the source. Closure of the contacts 7AU under the influence of the magnet R7 sets up a holding circuit leading from the source through wire $d'$, holding magnet R7, contacts 7AU, normally closed contacts 1BL, wires $v'$, $w'$, $x'$, $y'$, $z'$, numerical sort switch NS and wires $j'$, $f$, $g$, to the source. Contacts 7BL serve to energize holding magnet R5 and pick-up magnet R6. The circuit through holding magnet R6 and pick-up magnet R7 is open when the commutator C7 opens its circuit at 122° in the machine cycle.

Upon closure of the contacts 5BL (Fig. 9) under the influence of the magnet R5, circuits for the magnet R1 and its associated holding magnet which is operative during the first sorting operation again become effective. Contacts 1BL become open at this time to cause deenergization of the holding magnet R7.

Push button control

A pair of push button controlled contacts PB are provided whereby the machine may be advanced from one sorting operation to the next without passing a signal card therethrough. Since this control is resorted to only when the machine is not in operation, the commutator C7 may be in either its circuit closing or circuit opening condition. Where the circuit is open, when the push button is depressed and the contacts PB are closed, a circuit is completed through the magnet R8. This circuit exists from the source through wire $d'$, magnet R8, contacts PB, wires $n'$, $g'$, numerical sort switch NS, wires $j'$, $f$, $g$, to the source. Upon closure of the contacts 8BL under the influence of the magnet R8, a circuit is established through the magnet R9. This latter magnet is slow to energize. When the push button contacts PB are opened, the magnet R8 becomes deenergized, thus opening the contacts 8BL and deenergizing the magnet R9.

If the various signal card relays are conditioned for the first sorting operation, closure of the push button contacts PB would cause energization of the magnet R8 and consequent opening of its contacts 8AU. The magnet R2, however, will remain energized because its pick-up circuit will still be effective. Upon closure of the contacts 9AU and 9AL the pick-up circuit for the magnet R3 will become effective and a holding circuit for the magnet R2 will be maintained. This circuit exists from the source through wire $d'$, pick-up magnet R3, contacts 9AL, normally closed contacts 7AL, 1 contacts of magnet R2, wires $l'$, $f'$, $o'$, contacts 9AU, wire $g'$, numerical sort switch NS, and wires $j'$, $f$, $g$ to the source. The contacts 9AU establish a holding circuit for the pick-up magnet R3 and also cause magnet R4 to become energized. Contacts 3BL and 3AL become open to deenergize the various relay magnets for the first sorting operation. However, the circuit through holding magnet R2 is still maintained. When the push button contacts PB are open, the magnet R8 will become deenergized allowing the contacts 8BL to open, thus deenergizing magnet R9. Contacts 9AU will again establish a circuit to the commutator C7.

If the machine commences operation at this time, magnet R2 in the circuit of the commutator C7 will be deenergized before the first card is sorted. However, if the push button contacts PB are again closed, the contacts 8AU will become open and cause the pick-up magnet R2 to become deenergized. The contacts 9BL and 9AU serve to energize the magnet R5. Upon energization of this latter magnet, the contacts 5AU establish a holding circuit through the holding magnet R5 and also cause pick-up magnet R6 to become energized. Opening of the contacts 8AL serves to deenergize the holding magnet R3 and also pick-up magnet R4. Contacts 5BL then serve to hold the circuit through the pick-up magnet R1 open. Release of the push button and opening of the contacts PB will leave the circuit through the holding magnet R4 energized. If the machine is started, this latter magnet will be deenergized when the commutator C7 discontinues its circuit before the card reaches the sorting station. If the contacts PB are again closed, the pick-up magnet R7 will become energized and the various signal card control relays will be set up for the first sorting operation.

Sorting magnet circuits

NUMERICAL SORT

Where cards which have been punched with numerical designations are concerned, the various sorting magnet circuits are similar to one another and are dependent upon the locations of the code perforations in the cards. It is deemed sufficient for purposes of illustration to select for distribution the sorting circuits which are employed in connection with the sorting of cards that have been perforated with the code designation for the numeral 0 which, it will be remembered, consists of a single perforation in the third line of the seven line code, as may be seen in Fig. 4. During numerical sorting operations, the numerical sort switch NS will assume its left hand position, as viewed in Fig. 9, the upper left-hand corner thereof. By virtue of this position of the switch, the relay pick-up magnet RN will be energized at all times during numerical sorting operations and the cards will be distributed to the proper pockets by means of the various card relays shown in the lower regions of Fig. 9.

When, for example, a card which has been punched in the third line of the seven line code, thus representing the numeral 0, the card relay pick-up magnet M0 (Fig. 8) will be energized when the commutator C5 establishes its circuit at 280° in the machine cycle. This operation is immediately followed by energization of its associated holding magnet M0. At 151° in the next cycle a circuit will be completed through the sort magnet 53, at which time a card will be under the chute blade 42 (Fig. 1) leading to the 0 pocket (Fig. 7). The circuit involved leads from the negative side of the source through wire $d'$, sort magnet 53, holding magnet 53', wire $p'$, normally closed 3 contacts of relay magnet M5 (Fig. 10), 4 contacts of relay magnet M2b, normally closed 6 contacts of relay magnet M1, normally open 11 contacts of relay magnet M0 (now closed), normally open 11 contacts of relay magnet RN, the 9 contacts of the sort commutator Cso, wire $q'$, 0 segment of the selector commutator Cse, numerical sort switch NS ("on" position), and (Fig. 9) wires $j'$, $f$, $g$, to the source. Establishment of this circuit will cause energization of the sort magnet 53 and holding thereof by the holding magnet 53'. The holding circuit for the sorting magnet exists from the negative side of the line through wire $d'$, sort magnet 53, holding magnet 53', wire $t'$, commutator C6, wires $k'$ (Fig. 8), $m$, $n$, $o$, $p$, $q$, $r$ and $g$ to the source. This holding circuit for the sort magnet 53 is maintained by the commutator C6 until the latter opens its circuit at 230° in the machine cycle. Thus the proper chute blades are held in card receiving position until the card has advanced thereinto. Cards which are punched with code perforations representing the numerals 1 to 9 inclusive are all sorted in the same manner, but it is deemed unnecessary to trace the various circuits therefor, inasmuch as these circuits are merely variations of the settings of the several contacts associated with the decoder mechanism and which are operated under the control of the magnet RN together with the various card relay magnets.

ALPHABETIC SORT, NUMERIC CARDS

Where alphabetic sorting operations are concerned, all cards which have been perforated with numeric designations are sorted into the 1 pocket. During the first sorting operation card control pick-up and holding relay magnets R2 (Fig. 9) will be energized. Assuming a condition for a card perforated for the numeral 0 upon energization of the pick-up relay magnet M0, the 11 contacts of this magnet (Fig. 10a) and the sort magnet 53 will become energized at the proper time for distribution of the card into the 1 pocket by virtue of a circuit extending from the source through wires $g$ (Fig. 8), $f$, $j'$, numerical sort switch NS ("off" position), wire $q'$, 1 contacts of the sort commutator Cso, normally open 28 contacts of relay magnet R2, normally open 11 contacts of relay magnet M0, normally closed 6 contacts of relay magnet M1, normally closed 4 contacts of relay magnet M2b, normally closed 3 contacts of relay magnet M5, wires $u2$, $p'$, holding magnet 53' (Fig. 9), sort magnet 53, and wire $d'$ to the source. The holding circuit through the magnet 53' functions in the usual manner as has been previously described.

Reference to Fig. 4 will show that any card punched with numerical designations from 1 through 9 will cause energization of at least one of the pick-up relay magnets M5, M2b or M1 of Fig. 8. Therefore, any such cards will be conducted to the 1 pocket by virtue of a circuit leading from the source through wires $g$ (Fig. 8), $f$, $j'$ (Fig. 9), numerical sort switch NS ("off" position), wire $q'$ (Fig. 10a), 1 contacts of the sort commutator Cso, 30 contacts of the magnet R2 (now closed), then through one or more of the group of three 2 contacts of the relay magnets M5, M2b or M1, which are now closed, normally closed 2 contacts of the magnet M0, normally closed 3 contacts of the magnet M11, normally closed 3 contacts of the magnet M12, wires $u2$, $p'$, holding magnet 53' (Fig. 9), sort magnet 53, and wire $d'$ to the source.

ALPHABETIC CARDS

Reference to Fig. 7 will show that all cards perforated with alphabetical designations are, during the first sort, sorted into pockets 2 to 9 inclusive, 0 and 11. Cards perforated with the designations X, U, R, O, L, I, F and C are sorted into the 9, 8, 7, 6, 5, 4, 3 and 2 pockets respectively. Cards perforated with designations Y, V, S, P, M, J, G, D and A are sorted into the 11 pocket. Cards perforated with the designations Z, W, T, Q, N, K, H, E and B are distributed into the 0 pocket. For example, if a card punched with the alphabetical designation X is encountered, the pickup relays M0, M5 and M2b (Fig. 8) are energized and a potential circuit is then established which will energize the sort magnet 53 at the proper time for distribution thereof to the 9 pocket. The circuit involved extends from the source through wires $g$ (Fig. 8), $f$, $j'$, numerical switch NS ("off" position), wire $q'$, 9 contacts of the sort commutator Cso, 10 contacts of relay magnet R2 (now closed), 5 contacts of the relay magnet M0 (now closed), normally closed 3 contacts of relay magnet M1, normally closed 2 contacts of relay magnet M2a, 3 contacts of relay magnet M2b (now closed), 3 contacts of relay magnet M5 (now closed), wires $u2$, $p'$, holding magnet 53' (Fig. 9), sort magnet 53, and wire $d'$ to the source. Similar circuits are in effect for all other alphabetically punched cards.

Signal card operation

The signal card follows the first group of cards through the machine during the first sorting operation. This card serves to energize the card relay magnets M11 and M12, as previously described, thus energizing the card control relay magnet R4. As previously stated, when the commutator C7 establishes a circuit at 302°, the relay magnet R3 will become energized and the holding circuit for this magnet will also cause energization of the relay magnet R4. Energization of this latter magnet establishes a circuit from the source through wires $g$ (Fig. 8), $f$, $j'$, (Fig. 9), numerical sort switch NS ("off" position), wire $q'$, 11 contacts of the sort commutator Cso, 16 contacts of relay magnet R4 (now closed), 1 contacts of relay magnet R6, normally closed 1 contacts of the magnet RN, 2 contacts of the relay magnets M11 and M12, wires $u2$, $p'$, holding magnet 53', sort magnet 53, wire $d'$ to the source. As previously set forth, this circuit serves to set the machine up for the second sorting operation and to distribute the signal card to the 11 pocket wherein it is applied to the second group of cards on the top thereof.

The magnet R4 will remain energized during the entire second sorting operation and the proper circuits may be traced to sort cards perforated with the designations Y, V, S, P, M, J, G, D and A into pockets 9, 8, 7, 6, 5, 4, 3, 2 and 1 respectively. At the end of this second sorting operation, the signal card will again cause energization of the magnets M11 and M12, thus causing magnet R6 to become energized, while at the same time sending the signal card into the 0 pocket for positioning on top of the third group of cards therein. The circuit involved leads from the source through wires $g$ (Fig. 8), $f$, $j'$, (Fig. 9), numerical sort switch NS ("off" position), wire $q'$, 0 contacts of the sort commutator Cso, 1 contacts of the relay magnets R6 and RN, 2 contacts of the magnets M11 and M12, wires $u2$, $p'$, holding magnet 53' (Fig. 9), sort magnet 53 and wire $d'$, to the source. This circuit serves to leave the machine set up for the third sorting operation.

During the third sorting operation, the magnet R6 will remain energized and circuits may be found to distribute the cards Z, W, T, Q, N, K, H, E and B into pockets 9, 8, 7, 6, 5, 4, 3, 2 and 1 respectively. At the end of this sorting operation the signal card will cause energization of the magnet R7 and be distributed into the 9 pocket on top of the last card in that pocket. This places the signal card behind the last alphabetical card when the cards are removed from the pocket. The circuit involved leads from the source through wires $g$ (Fig. 8), $f$, $j'$, numerical sort switch NS ("off" position), wire $q'$, 9 contacts of the sort commutator Cso, contacts 7AU, normally closed 1 contacts of the magnet RN, 2 contacts of the magnets M11 and M12, wires $u2$, $p'$, holding magnet 53' (Fig. 9), sort magnet 53, and wire $d'$ to the source. This circuit serves to leave the machine set up for the first sorting operation with a new group of cards and, if sorting is to be conducted in a different card column, it is merely necessary to shift the card brush to the proper column in the usual manner.

During alphabetical sorting operations, the selective commutator Cse is not employed and provision is made whereby it is shorted out of the circuit by the positioning of the numerical sort switch NS to its "off" position.

After the third sorting operation, the cards will remain in the various pockets 1 to 9 inclusive alphabetically sorted and each group of cards will contain therein three sequentially arranged groups, with the exception of the 1 pocket which will contain only two groups of cards, namely, the A cards and the B cards. The C, D and E cards will fall in the 2 pocket; F, G and H cards will fall in the 3 pocket, etc., with the X, Y and Z cards falling into the 9 pocket. Obviously, then, it is merely necessary to remove the cards from the pockets, taking the pockets from right to left, as shown in Fig. 7, and to place them one upon the other so that ultimately all of the groups will be sequentially arranged alphabetically with the signal card resting on the top of the stack. The signal card may then be removed for return to the machine to control the operations thereof in connection with a subsequent sorting operation of a new group of cards.

In the foregoing description it has been deemed necessary to trace only a few typical circuits through the decoding mechanism 105 and this has involved the citation of only a few relay control contacts. A large number of additional contacts appear in the decoding mechanism and it will be understood that these contacts operate under the control of their respective magnets which have been shown alongside them in dotted lines. Thus for the decoding of any desired character the circuits involved will become obvious.

While there have been shown and described and pointed out the fundamental novel features of the invention as applied to a preferred embodiment, it will be understood that various omissions and substitutions and changes in the form and details of the apparatus illustrated and in its operation may be made by those skilled in the art without departing from the spirit of the invention. It is the intention, therefore, to be limited only as indicated by the scope of the following claims.

What is claimed is:

1. The method of sorting cards bearing alphabetical designations which comprises passing the cards through a sensing station and, under the control of a sensing operation, specifically sorting and distributing cards bearing certain selected alphabetical designations which are sequentially three times alphabetically removed from each other to individual card-receiving pockets while at the same time under sensing control partially sorting and distributing cards not bearing the selected designations to a pair of additional card-receiving pockets, such partial sorting and distributing operations consisting in the placement of cards bearing designations once removed from the designations of cards previously distributed into one of the additional pockets and the placement of cards bearing designations twice removed from said previously distributed cards into the other additional pocket, thereafter returning said two groups of cards from said additional pockets to the sensing station in the order named and by a specific sensing operation sorting and distributing the cards of the first group of returned cards into the pockets in such a manner that cards bearing designations once removed from the designations of previously distributed cards will fall upon the latter, and under sensing control specifically sorting and distributing the cards from the second group of returned cards in such a manner that cards bearing designations twice removed from the first distributed cards will fall upon the second distributed cards, whereby the cards finally distributed to each pocket will be alphabetically arranged in groups of cards bearing at the most three alphabetical designations.

2. The method of sorting cards bearing alphabetical designations which comprises passing the cards through a sensing station and under the control of a sensing operation; performing a first sorting operation upon the cards wherein cards bearing certain alphabetical designations which are sequentially three times alphabetically removed from each other to individual card-receiving locations while at the same time under sensing control partially sorting and distributing cards not bearing the selected designations to two separate additional card-receiving locations, such partial sorting and distributing operations consisting in the placement of cards bearing designations once removed from the designations of cards previously distributed, at one of said additional locations and the placement of cards bearing designations twice removed from said previously distributed cards at the other location, performing a second sorting operation under sensing control wherein cards previously placed at said first specified location are distributed and placed upon the previously sorted and distributed cards in such a manner that cards bearing designations once removed from the designations of said previously distributed cards will fall upon the latter and, finally, performing a third sorting operation under sensing control wherein the cards previously placed at said other specified location are distributed and placed upon the cards resulting from the second sorting operation.

3. The method of sorting cards bearing punched alphabetical and numerical designations indiscriminately arranged in a stack which comprises passing the cards through a sensing station and, under the control of a sensing operation, specifically sorting and distributing cards bearing certain alphabetical designations which are equally alphabetically removed from each other to individual card-receiving pockets while at the same time, by a partial sorting operation under sensing control, distributing cards not bearing the selected alphabetical designations or numerical designations to a pair of additional card-receiving pockets, distributing cards bearing numerical designations to another additional pocket and distributing unpunched cards to still another additional pocket, such partial sorting and distributing operations consisting in the placement of cards bearing designations once removed from the designations of cards previously distributed into one of said pair of additional pockets and the placement of cards bearing designations twice removed from said previously distributed cards into the other pocket of said pair, thereafter returning the two groups of cards from said pair of additional pockets to the sensing station in the order named and by a sensing operation specifically sorting and distributing the cards from the first group of returned cards into the pockets in such a manner that cards bearing designations once removed from the designations of previously distributed cards will fall upon the latter and specifically sorting and distributing the cards from the second group of returned cards in such a manner that cards bearing designations twice removed from the first distributed cards will fall upon the second distributed cards whereby the cards finally distributed to each pocket will be alphabetically arranged in groups of cards bearing at the most three alphabetical designations.

4. The method of sorting cards bearing punched alphabetical designations which comprises passing the cards through a sensing station and, under the control of a sensing operation, distributing cards bearing the designations X, U, R, O, L, I, F and C to individual card-receiving pockets, while at the same time partially sorting and distributing cards bearing all other designations to an additional pair of card-receiving pockets, such partial sorting and distributing operations consisting in the placement of cards bearing designations Y, V, S, P, M, J, G, D and A into an additional pocket and in the placement of cards bearing designations Z, W, T, Q, N, K, H, E and B into another additional pocket, thereafter returning the two groups of partially sorted cards from said additional pockets to the sensing station in the order named and by a specific sensing operation distributing the cards from the first group of returned cards into the pockets in such a manner that cards bearing the designations Y, V, S, P, M, J, G and D fall on top of the previously distributed cards bearing designations X, U, R, O, L, I, F and C respectively, and that cards bearing the designation A fall into an additional pocket, and specifically sorting and distributing the cards from the second group of returned cards in such a manner that cards bearing the designations Z, W, T, Q, N, K, H, E and B fall upon the second distributed cards bearing designations Y, V, S, P, M, J, G, D and A respectively.

5. The method of sorting cards bearing punched alphabetical and numerical designations which comprises passing the cards through a sensing station and under the control of a sensing operation distributing cards bearing the designations X, U, R, O, L, I, F and C to individual card-receiving pockets arbitrarily designated at 9, 8, 7, 6, 5, 4, 3 and 2 respectively, while at the same time partially sorting and distributing cards bearing all other alphabetical designations to an additional pair of card-receiving pockets arbitrarily designated as 0 and 11, such partial sorting and distributing operations consisting in the placement of cards bearings designations Y, V, S, P, M, J, G, D and A into the pocket designated as 11 and in the placement of cards bearing designations Z, W, T, Q, N, K, H, E and B into the pocket designated 0, distributing cards bearing numerical designations into a pocket arbitrarily designated as 1, and distributing unpunched cards into a pocket arbitrarily designated as R, removing the cards from the pockets 1 and R, thereafter returning the cards from the pockets 0 and 11 to the sensing station in the order named and by a specific sensing operation distributing cards bearing designations Y, V, S, P, M, J, G, D and A into the pockets 9, 8, 7, 6, 5, 4, 3, 2 and 1 respectively, and thereafter distributing cards bearing designations Z, W, T, Q, N, K, H, E and B into the pockets 9, 8, 7, 6, 5, 4, 3, 2 and 1 respectively, and finally placing the cards from each numerically designated pocket on top of the cards from each numerically designated pocket of next succeeding lower numerical order whereby the cards will be alphabetically arranged.

6. In a sorting machine for sorting perforated record cards bearing alphabetical designations in the form of one or more code perforations arranged in a single card column, a plurality of card-receiving pockets, a circuit-closing sensing brush, means for feeding the cards past said brush in a columnar direction whereby the perforations therein are traversed by the brush successively, means operable each time a perforation is traversed for closing a sensing circuit, means for maintaining each circuit closed until all the perforations in a card column have been traversed, a control card perforated according to a selected designation and designed for passage through the machine, a decoding device including a series of normally open labyrinth circuits, means operable under the control of said sensing circuits for closing one of said labyrinth circuits for each position of a code perforation in a card column, means operable in timed relation to the passage of cards past said brush for energizing the closed circuit, card distributing means operable upon energization of each labyrinth circuit for selectively placing a card in a predetermined pocket, and means when said control card is traversed for causing said sensing circuits to close a different labyrinth circuit for each arrangement of card perforations in a card column.

7. In a cyclically operable sorting machine for sorting perforated record cards bearing designations in the form of one or more code perforations arranged in a single card column, a plurality of card-distributing blades, a circuit-closing sensing brush, means for feeding said cards past said brush in a columnar direction and into cooperation with the blades whereby the perforations are traversed by the brush successively, means operable each time a perforation is traversed for closing a sensing circuit, means for maintaining each sensing circuit closed until all of the perforations in a card column have been traversed, said blades having their receiving ends progressively decreasing in length, means for actuating the blades, said cards operating upon actuation of the blades to arrest the opening of such blades as have already been traversed by an advancing card whereby the card effects selection of a passage between the blades, a decoding device including a series of normally open labyrinth circuits, means operable under the control of said sensing circuits for selectively closing one of said labyrinth circuits for each position of a code perforation in a card column, a control card perforated according to a selected designation and designed for cooperation with said sensing brush, means operable upon sensing of said control card for selectively closing a different labyrinth circuit for each arrangement of a code perforation in the card column, and means operable in timed relation to the passage of cards through the machine for energizing the closed labyrinth circuit to actuate the blades.

8. In a cyclically operable sorting machine for sorting a group of perforated record cards bearing alphabetic designations in the form of one or more code perforations arranged in a single card column, said group also including a set-up control card bearing a special control designation, a circuit closing sensing brush, means for feeding the cards past said brush in a columnar direction and into cooperation with said blades with the control card following said other cards whereby the perforations in said cards are traversed by the brush successively, means operable each time a perforation is traversed for closing a sensing circuit, means for maintaining each circuit closed until all of the perforations in a card column have been traversed, means for actuating said blades, said cards operating upon actuation of the blades to arrest the opening of such blades as have already been traversed by an advancing card whereby the cards will effect selection of a passage between the blades, a decoding device including a series of normally open labyrinth circuits operable upon closing and energization thereof to effect blade actuation, means operable under the combined control of said closed sensing circuits for closing one, and only one, of said labyrinth circuits for each code combination in a card column, means operable in timed relation to the passage of cards through the machine for energizing the closed labyrinth circuit to effect blade actuation, and means operable under the control of the control designation in said control card for selecting the particular labyrinth circuits which are to be closed and energized under the control of said code combinations.

KENNETH W. DEAN.
HORACE S. BEATTIE.
RALPH E. PAGE.

REFERENCES CITED

The following references are of record in the file of this patent:

UNITED STATES PATENTS

| Number | Name | Date |
| --- | --- | --- |
| 1,946,904 | Ford | Feb. 13, 1934 |
| 2,025,602 | Maul | Dec. 24, 1935 |
| 2,209,414 | Maul | July 30, 1940 |
| 2,265,442 | Maul | Dec. 9, 1941 |